US012746653B2

(12) United States Patent
Ye et al.

(10) Patent No.: US 12,746,653 B2
(45) Date of Patent: Sep. 29, 2026

(54) NAIL GUN

(71) Applicant: Nanjing Chervon Industry Co., Ltd., Nanjing (CN)

(72) Inventors: Junjie Ye, Nanjing (CN); Jie Jiang, Nanjing (CN); Ran Lan, Nanjing (CN)

(73) Assignee: Nanjing Chervon Industry Co., Ltd., Nanjing (CN)

( * ) Notice: Subject to any disclaimer, the term of this patent is extended or adjusted under 35 U.S.C. 154(b) by 74 days.

(21) Appl. No.: 18/452,629

(22) Filed: Aug. 21, 2023

(65) Prior Publication Data

US 2024/0100672 A1 Mar. 28, 2024

(30) Foreign Application Priority Data

Sep. 23, 2022 (CN) ........................ 202211161524.X
Jul. 12, 2023 (CN) ........................ 202310855579.9
Jul. 12, 2023 (CN) ........................ 202310856727.9

(51) Int. Cl.
*B25C 1/06* (2006.01)
*B25C 7/00* (2006.01)

(52) U.S. Cl.
CPC . *B25C 1/06* (2013.01); *B25C 7/00* (2013.01)

(58) Field of Classification Search
CPC .. B25C 1/06; B25C 7/00; B25C 1/008; B25C 1/047; B25C 1/08; B25C 1/04; B25C 1/005; B25C 1/00; B25C 1/001; B25C 1/041; B25C 1/042; B25C 1/043
See application file for complete search history.

(56) References Cited

U.S. PATENT DOCUMENTS 5,219,110 A 6/1993 Mukoyama
2007/0221698 A1* 9/2007 St. John .................. G05G 5/06 227/131
2007/0272422 A1* 11/2007 Coleman .................. B25C 1/06 173/1
2009/0127310 A1* 5/2009 Yu ........................ B25C 5/1665 227/8
2012/0160889 A1 6/2012 Tanji

FOREIGN PATENT DOCUMENTS

| | | | |
|---|---|---|---|
| CN | 201067892 | Y | 6/2008 |
| CN | 214723920 | U | 11/2021 |
| EP | 1839815 | A1 | 6/2011 |
| JP | H03103208 | U | 10/1991 |
| WO | 2020214558 | A1 | 10/2020 |

OTHER PUBLICATIONS

Office Action from Canadian application No. 3,211,577, dated Jan. 16, 2025, 5 pp.

* cited by examiner

*Primary Examiner* — Veronica Martin
(74) *Attorney, Agent, or Firm* — Greenberg Traurig, LLP

(57) ABSTRACT

A nail gun includes: a housing; an accessory box for accommodating a fastener and at least partially connected to the housing; and a power output portion for outputting a striking force to the fastener; and an operating member triggered to have at least a first position and a second position, where the nail gun has a maximum desired penetration depth when the operating member is operated to the first position, and the nail gun has a minimum desired penetration depth when the operating member is operated to the second position; and when the operating member switches from the first position to the second position, an angle by which the operating member rotates about a first straight line is less than or equal to 360°.

18 Claims, 15 Drawing Sheets

NAIL GUN

RELATED APPLICATION INFORMATION

This application claims the benefit under 35 U.S.C. § 119(a) of Chinese Patent Application No. CN 202211161524.X, filed on Sep. 23, 2022, Chinese Patent Application No. CN 202310855579.9, filed on Jul. 12, 2023, and Chinese Patent Application No. CN 202310856727.9, filed on Jul. 12, 2023, which applications are incorporated herein by reference in their entireties.

TECHNICAL FIELD

The present application relates to a fastening tool and, in particular, to a nail gun.

BACKGROUND

A nail gun in the related art has many functions but provides no desired flexibility and no convenient function for a user. For example, in some cases, a structure for adjusting the penetration depth of a fastener needs to be operated by the user multiple times to rotate. Therefore, it is still necessary to improve the existing nail gun.

SUMMARY

A nail gun includes: a housing; an accessory box used for accommodating a fastener and at least partially connected to the housing; a power output portion for outputting a striking force to the fastener; and an operating member triggered to have at least a first position and a second position, where the nail gun has a maximum desired penetration depth when the operating member is operated to the first position, and the nail gun has a minimum desired penetration depth when the operating member is operated to the second position; and when the operating member is triggered to switch from the first position to the second position, an angle by which the operating member rotates about a first straight line is less than or equal to 360°.

Optionally, when the operating member is triggered to switch from the first position to the second position, an angle by which the operating member rotates about the first straight line is less than or equal to 180°.

Optionally, the operating member is capable of being triggered to have a third position, and the operating member at the third position is capable of being triggered to switch to the first position or the second position.

Optionally, the nail gun further includes a trigger member and a first switch, where the trigger member is connected to the power output portion and is movable relative to the accessory box to a first state in which the first switch is triggered and a second state in which the first switch is not triggered, and the power output portion stops outputting the striking force when the first switch is not triggered.

Optionally, the first switch is triggered once such that the power output portion outputs the striking force to the fastener once.

Optionally, the trigger member includes at least a trigger rod, a drive rod, and a gear piece, where the gear piece is formed with or connected to multiple stoppers, a first end of the drive rod abuts against the gear piece, and a second end of the drive rod is connected to the trigger rod.

Optionally, the drive rod is movable along the first straight line when the operating member is operated to rotate about the first straight line.

Optionally, the operating member includes a first portion at least partially disposed in the housing and a second portion extending from the first portion to the outside of the housing.

Optionally, the second portion is triggered to move the trigger member toward and away from the housing so that a desired penetration depth of the nail gun is defined.

Optionally, a first stopper and a second stopper are formed on the housing, where the operating member is located at the first position when abutting against the first stopper, and the operating member is located at the second position when abutting against the second stopper.

Optionally, the nail gun further includes a brake member switching from a released state to a locked state when the fastener satisfies a preset state, where the power output portion stops outputting the striking force when the brake member is in the locked state. The brake member is at least partially located above the fastener.

Optionally, the accessory box includes a first housing, a second housing, and an upper cover, where the first housing and the second housing form an accommodating space for accommodating the fastener, the upper cover is disposed above the fastener, and the brake member is connected to the upper cover.

Optionally, the brake member includes a brake piece formed with or connected to a first brake portion and a second brake portion, the upper cover is formed with a through hole, and the second brake portion is at least partially disposed in the through hole.

Optionally, the accessory box further includes a nail pusher for applying pressure to the fastener, where the nail pusher is formed with a slot disposed opposite to the second brake portion in an up and down direction.

Optionally, the nail gun further includes a trigger member and a first switch, where the trigger member is connected to the power output portion and is movable relative to the accessory box to a first state in which the first switch is triggered and a second state in which the first switch is not triggered, and the power output portion stops outputting the striking force when the first switch is not triggered.

A nail gun includes: a housing; an accessory box used for accommodating a fastener and at least partially connected to the housing; and a power output portion for outputting a striking force to the fastener. The nail gun further includes: an operating member, where an operating piece is triggered to have a first position and a second position, the nail gun has a maximum desired penetration depth when the operating member is operated to the first position, and the nail gun has a minimum desired penetration depth when the operating member is operated to the second position. The operating member includes an operating portion disposed outside the housing, where the distance of the operating portion is greater than or equal to 5 mm when the operating member is located at the first position and the second position.

Optionally, the operating member further includes a second portion disposed in the housing, where the second portion is triggered to move a trigger member toward and away from the housing so that a desired penetration depth of the nail gun is defined.

Optionally, a trigger member is connected to the power output portion and is movable relative to the accessory box to a first state in which a first switch is triggered and a second state in which the first switch is not triggered, and the power output portion stops outputting the striking force when the first switch is not triggered.

A nail gun includes: a housing; an accessory box used for accommodating a fastener and at least partially connected to the housing; and a power output portion for outputting a striking force to the fastener. The nail gun further includes: an operating member triggered to have at least a first position and a second position, where the nail gun has a maximum desired penetration depth when the operating member is operated to the first position, and the nail gun has a minimum desired penetration depth when the operating member is operated to the second position. The operating member includes an operating portion disposed outside the housing, where a projection of the operating portion being on a first plane when the operating member is located at the first position separately and a projection of the operating portion being on the first plane when the operating member is located at the second position separately are at least partially non-overlapping with each other, and the first plane is substantially perpendicular to the direction in which the fastener is shot.

Optionally, the operating member further includes a second portion disposed in the housing, where the second portion is triggered to move a trigger member toward and away from the housing so that a desired penetration depth of the nail gun is defined.

DETAILED DESCRIPTION

Figure 1:
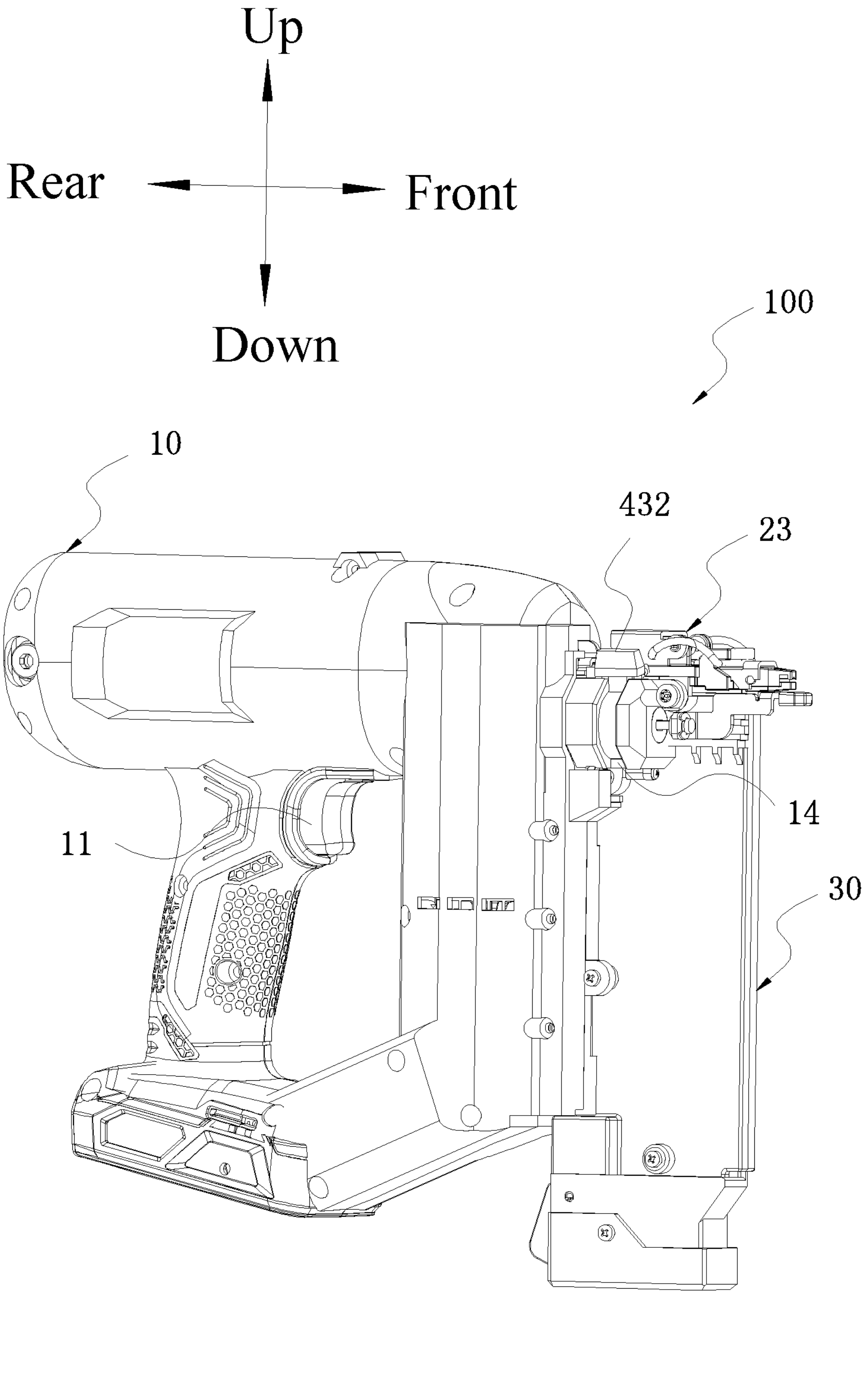
FIG. 1 is a perspective view of a nail gun as an example.

Before any examples of this application are explained in detail, it is to be understood that this application is not limited to its application to the structural details and the arrangement of components set forth in the following description or illustrated in the above drawings.

In this application, the terms “comprising”, “including”, “having” or any other variation thereof are intended to cover an inclusive inclusion such that a process, method, article or device comprising a series of elements includes not only those series of elements, but also other elements not expressly listed, or elements inherent in the process, method, article, or device. Without further limitations, an element defined by the phrase “comprising a . . . ” does not preclude the presence of additional identical elements in the process, method, article, or device comprising that element.

In this application, the term “and/or” is a kind of association relationship describing the relationship between associated objects, which means that there can be three kinds of relationships. For example, A and/or B can indicate that A exists alone, A and B exist simultaneously, and B exists alone. In addition, the character “/” in this application generally indicates that the contextual associated objects belong to an “and/or” relationship.

In this application, the terms “connection”, “combination”, “coupling” and “installation” may be direct connection, combination, coupling or installation, and may also be indirect connection, combination, coupling or installation. Among them, for example, direct connection means that two members or assemblies are connected together without intermediaries, and indirect connection means that two members or assemblies are respectively connected with at least one intermediate members and the two members or assemblies are connected by the at least one intermediate members. In addition, “connection” and “coupling” are not limited to physical or mechanical connections or couplings, and may include electrical connections or couplings.

In this application, it is to be understood by those skilled in the art that a relative term (such as “about”, “approximately”, and “substantially”) used in conjunction with quantity or condition includes a stated value and has a meaning dictated by the context. For example, the relative term includes at least a degree of error associated with the measurement of a particular value, a tolerance caused by manufacturing, assembly, and use associated with the particular value, and the like. Such relative term should also be considered as disclosing the range defined by the absolute values of the two endpoints. The relative term may refer to plus or minus of a certain percentage (such as 1%, 5%, 10%, or more) of an indicated value. A value that did not use the relative term should also be disclosed as a particular value with a tolerance. In addition, “substantially” when expressing a relative angular position relationship (for example, substantially parallel, substantially perpendicular), may refer to adding or subtracting a certain degree (such as 1 degree, 5 degrees, 10 degrees or more) to the indicated angle.

In this application, those skilled in the art will understand that a function performed by an assembly may be performed by one assembly, multiple assemblies, one member, or multiple members. Likewise, a function performed by a member may be performed by one member, an assembly, or a combination of members.

In this application, the terms “up”, “down”, “left”, “right”, “front”, and “rear” and other directional words are described based on the orientation or positional relationship shown in the drawings, and should not be understood as limitations to the examples of this application. In addition, in this context, it also needs to be understood that when it is mentioned that an element is connected “above” or “under” another element, it can not only be directly connected "above" or "under" the other element, but can also be indirectly connected "above" or "under" the other element through an intermediate element. It should also be understood that orientation words such as upper side, lower side, left side, right side, front side, and rear side do not only represent perfect orientations, but can also be understood as lateral orientations. For example, lower side may include directly below, bottom left, bottom right, front bottom, and rear bottom.

In this application, the terms "controller", "processor", "central processor", "CPU" and "MCU" are interchangeable. Where a unit "controller", "processor", "central processing", "CPU", or "MCU" is used to perform a specific function, the specific function may be implemented by a single aforementioned unit or a plurality of the aforementioned unit.

In this application, the term "device", "module" or "unit" may be implemented in the form of hardware or software to achieve specific functions.

In this application, the terms "computing", "judging", "controlling", "determining", "recognizing" and the like refer to the operations and processes of a computer system or similar electronic computing device (e.g., controller, processor, etc.).

FIG. 1 shows a nail gun 100 as an example in the present application. The nail gun 100 is used for generating a striking force on a nail to shoot the nail into a workpiece. In this specification, the front, rear, left, right, up, and down directions are defined as the directions shown in FIG. 1. Specifically, when the nail gun 100 is operated by a user, the direction in which a fastener is shot is defined as the front direction, and the extension direction of an accessory box is defined as an up and down direction.

As shown in FIGS. 1 to 4, the nail gun 100 includes a housing 10, a power output portion 20 at least partially disposed in the housing 10, and an accessory box 30 connected to the housing 10. The power output portion 20 includes an output assembly 21, a motor 22 for driving the output assembly 21 to move, and an output end 23. In some examples, the accessory box 30 is used for accommodating the fastener and is connected to the output end 23 of the power output portion 20. The output end 23 is provided with an output port 231. In this example, the accessory box 30 is a nail box, and the fastener may be a nail, a staple, a brad, a paper pin, or any suitable fastener which may be driven into the workpiece. The output port 231 is a nail outlet. In some examples, the nail gun 100 further includes a cylinder 24. In the present application, the working principle and model of the cylinder 24 are not limited, and the details are not repeated here.

The nail gun 100 further includes a control mechanism. When the user mounts the fastener into the accessory box 30, the control mechanism is operated such that nailing can be performed. The control mechanism includes a second switch 11 and a first switch 12. When the second switch 11 and the first switch 12 are triggered at the same time, the nail gun 100 can be started and perform a nailing function. In some examples, the first switch 12 is triggered once such that the power output portion 20 outputs a striking force only once, and the first switch 12 needs to be triggered again when it is necessary for the power output portion 20 to output the striking force again. In some examples, the nail gun 100 has the function of continuously feeding nails. It is to be understood that the first switch 12 is triggered once such that the power output portion 20 continuously outputs the striking force. In this example, the second switch 11 is configured to be a trigger, and the first switch 12 is configured to be a microswitch.

Figure 4:
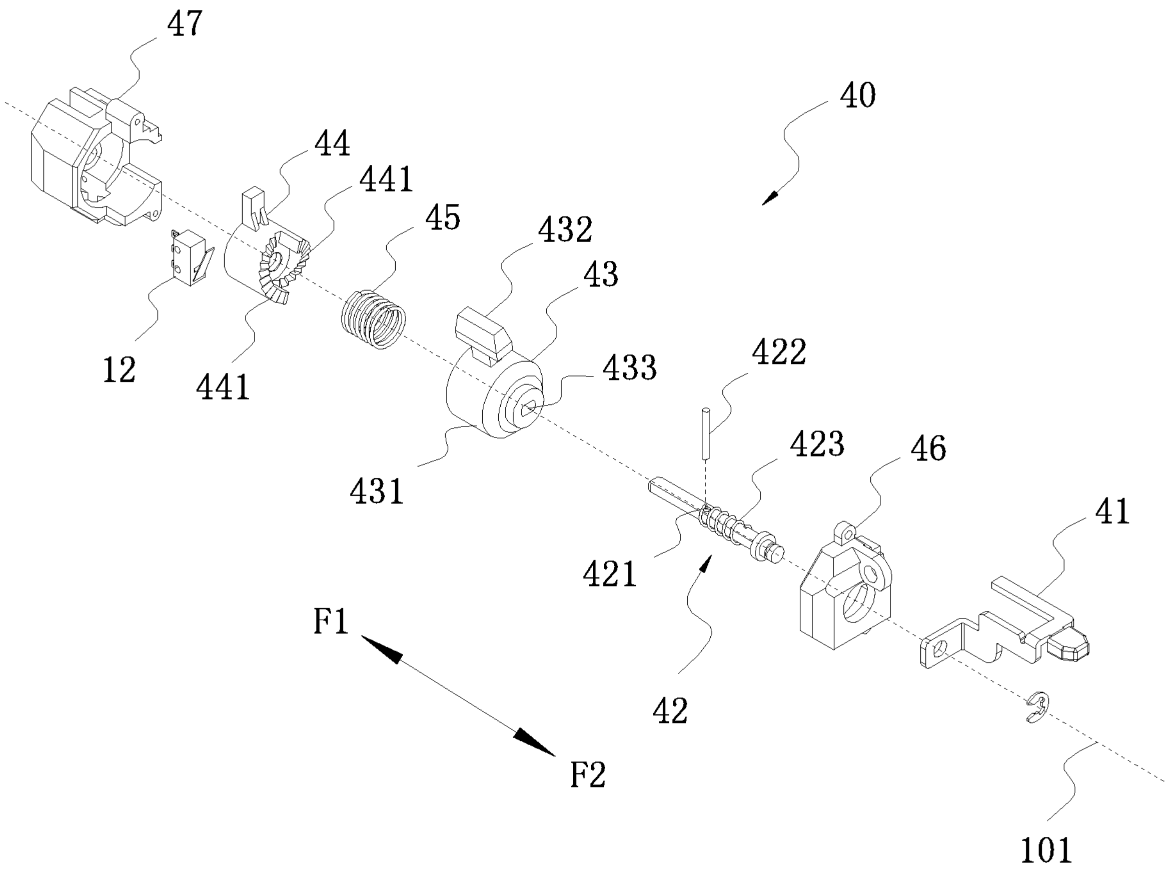
FIG. 4 is an exploded view of a trigger member of the nail gun in FIG. 1.

Next, the working principle of the first switch 12 and a trigger member 40 for triggering the first switch 12 are described in conjunction with FIG. 4. The trigger member 40 is connected to at least one of the housing 10, the accessory box 30, or the output end 23. In this example, the trigger member 40 is connected to the output end 30.

The trigger member 40 is connected to the power output portion 20. The trigger member 40 is movable relative to the accessory box 30 to a first state in which the first switch 12 is triggered and a second state in which the first switch 12 is disengaged. It is to be understood that the first switch 12 is triggered when the trigger member 40 is in the first state. When the trigger member 40 is in the second state, the first switch 12 is not triggered, that is, the first switch 12 is in the off state. In some examples, the trigger member 40 includes a trigger rod 41, a drive mechanism 42, a gear piece 44, a first resilient element 45, and a base 46 and a cover 47 which are used for partially accommodating the preceding assemblies.

Figure 5:
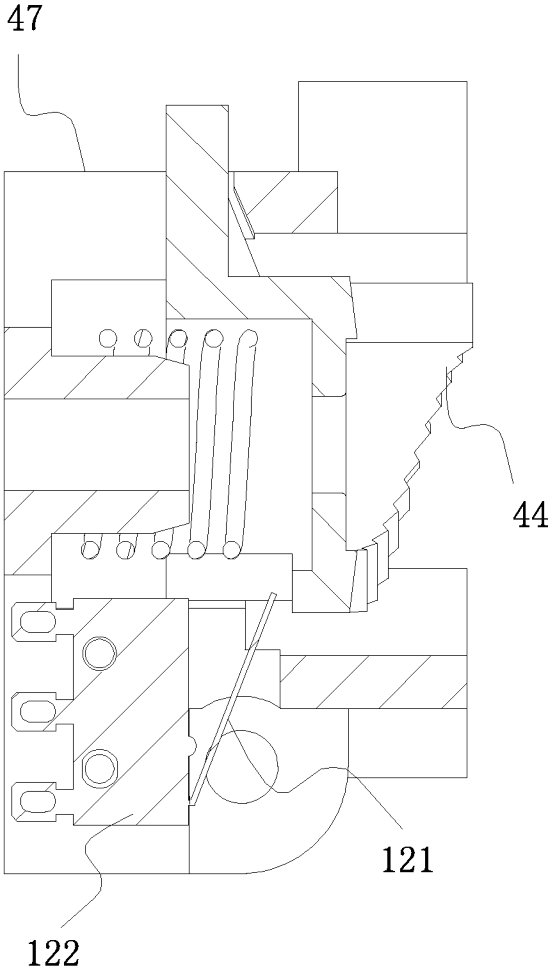
FIG. 5 is a schematic view showing the position where a second switch of the nail gun in FIG. 1 is mounted.

Specifically, the trigger rod 41 is mounted to the output end 23 and is movable along the extension direction of a first straight line 101 under the action of an external force. When the trigger rod 41 is triggered along the direction of an arrow F1 in FIG. 4, the trigger rod 41 drives the drive member 42 to move along the direction of the arrow F1, and the drive member 42 drives the gear piece 44 to move along the direction of the arrow F1. When the gear piece 44 is driven by the drive member 42 to move along the direction of the arrow F1 to trigger the first switch 12, the trigger member 40 is switched from the second state to the first state. In this example, referring to FIG. 5, the first switch 12 includes a contact 121 and a switch body 122. The switch body 122 is mounted to the base 46. When moving along the first straight line 101, the gear piece 44 drives the contact 121 to be in contact with the switch body 122. After the contact 121 is in contact with the switch body 122, the first switch 12 is triggered. When the force applied to the trigger rod 41 decreases or disappears, the gear piece 44 moves along the direction of an arrow F2 in FIG. 4 under the force of the first resilient element 45 so that the contact 121 is separated from the switch body 122 and the first switch 12 is turned off.

Figure 2:
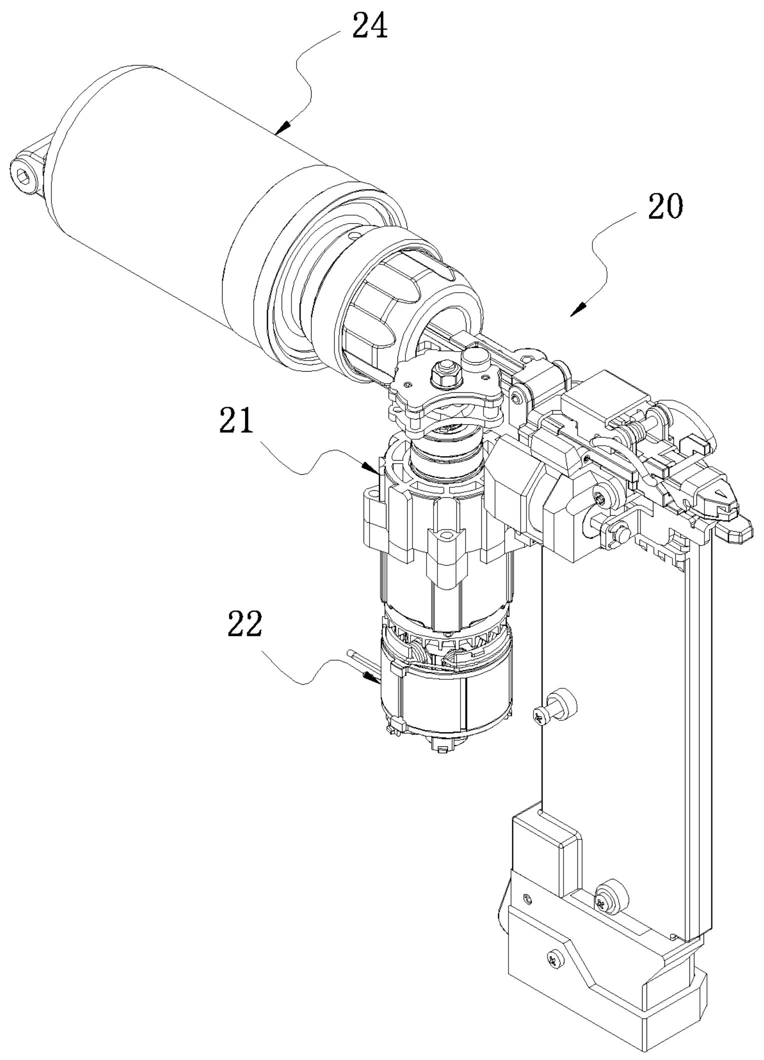
FIG. 2 is a perspective view of the nail gun in FIG. 1 with a housing removed.
Figure 3:
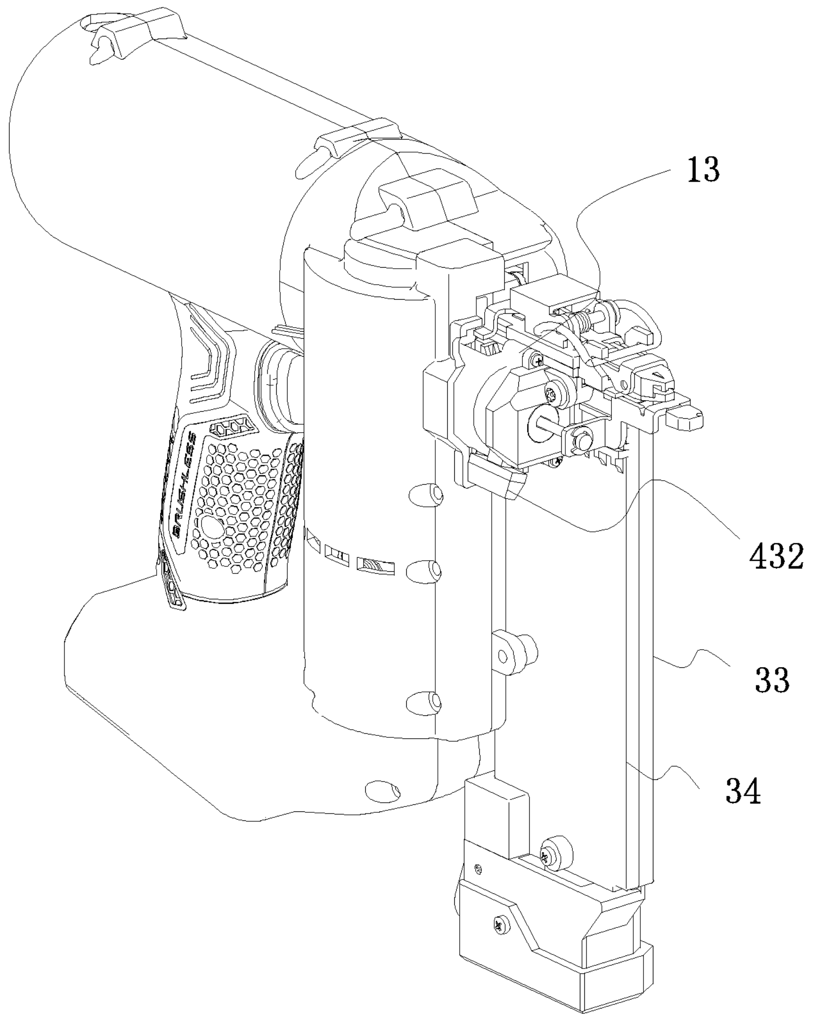
FIG. 3 is a perspective view of the nail gun in FIG. 1 in another state.

In some examples, referring to FIGS. 2 to 4, the nail gun 100 further includes an operating member 43 for the user to manipulate. The operating member 43 can be triggered to rotate about the first straight line 101 to move the trigger member 40 toward or away from the housing 10 so that a desired penetration depth of the nail gun 100 is defined.

Specifically, the operating member 43 includes a first portion disposed in the housing 10 and a second portion located outside the housing 10. In this example, the first portion is configured to be a rotating body 431, and the second portion is configured to be an operating piece 432 for the user to manipulate. When the operating piece 432 is operated to rotate about the first straight line 101, the rotating body 431 is driven to rotate about the first straight line 101 too. Specifically, the first straight line 101 does not pass through the operating piece 432. The drive member 42 includes a drive rod 421, a stopper rod 422, and a second resilient element 423. The drive rod 421 is formed with a first through hole 4211 and sleeved on the stopper rod 422 through the first through hole 4211. The second resilient element 423 is sleeved on the drive rod 421. The rotating body 431 is formed with a second through hole 4311 along the direction of the first straight line 101 and sleeved on the drive rod 421 through the second through hole 4311. Multiple stoppers 441 are formed on or connected to the gear piece 44, and the stopper rod 422 abuts against a stopper 441 of the gear piece 44. In some examples, the rotating body 431 and the drive rod 421 are in a flat connection to each other through the second through hole 4311.

Thus, when the operating piece 432 is operated to rotate about the first straight line 101, the rotating body 431 is driven by the operating piece 432 to rotate about the first straight line 101. Since the rotating body 431 and the drive rod 421 are in the flat connection to each other through the second through hole 4311, the rotating body 431 drives, through the second through hole 4311, the drive rod 421 to rotate about the first straight line 101. Since the drive rod 421 and the stopper rod 422 are connected to each other through the first through hole 4211, the drive rod 421 drives, through the first through hole 4211, the drive rod 422 to abut against different stoppers 441 on a gear piece 44. Thus, the trigger rod 41 is moved toward or away from the housing 10 such that the adjustment of the desired penetration depth of the nail gun 100 is completed.

Figure 6A:
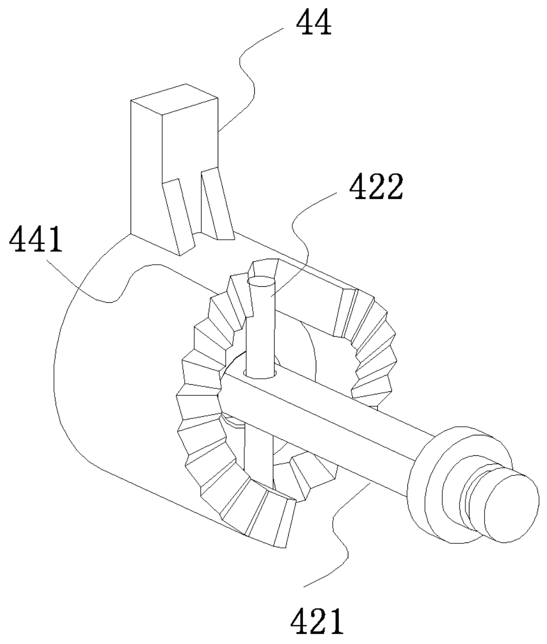
FIG. 6*a* shows the positional relationship between a drive rod and a gear piece in the case where a nail gun has a maximum penetration depth.
Figure 6B:
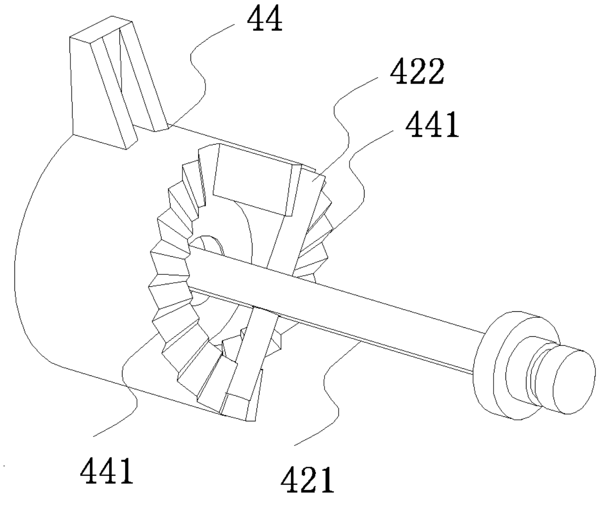
FIG. 6*b* shows the positional relationship between a drive rod and a gear piece in the case where a nail gun has a minimum penetration depth.
Figure 7:
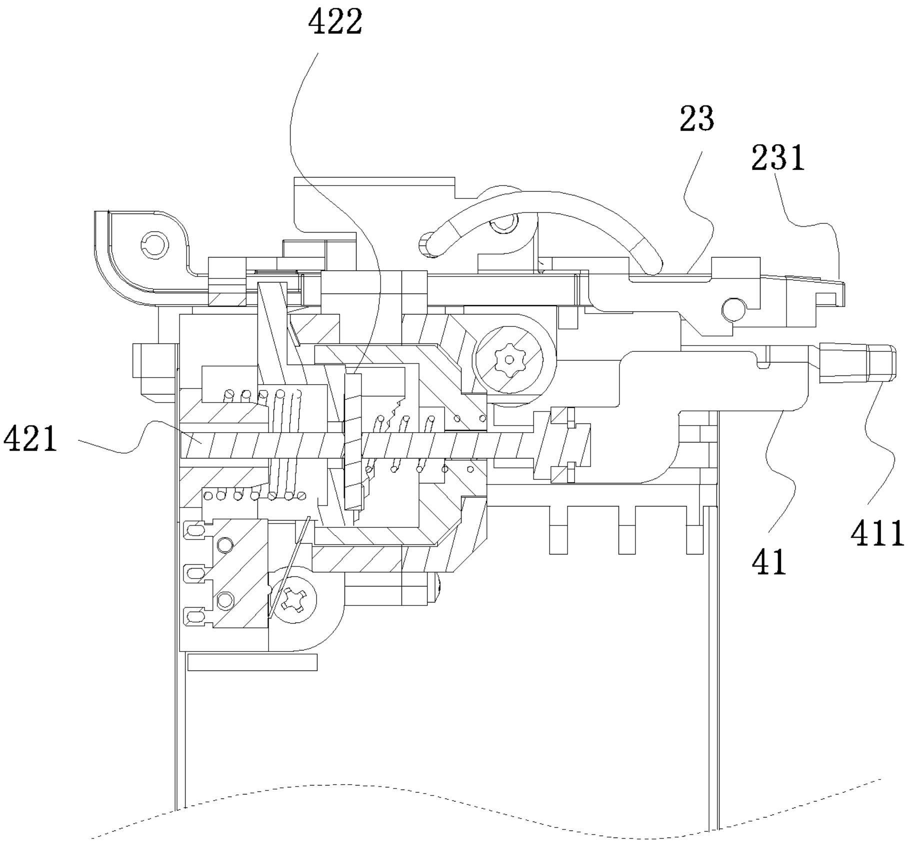
FIG. 7 is a sectional view of a trigger member when a nail gun has a maximum penetration depth.
Figure 8:
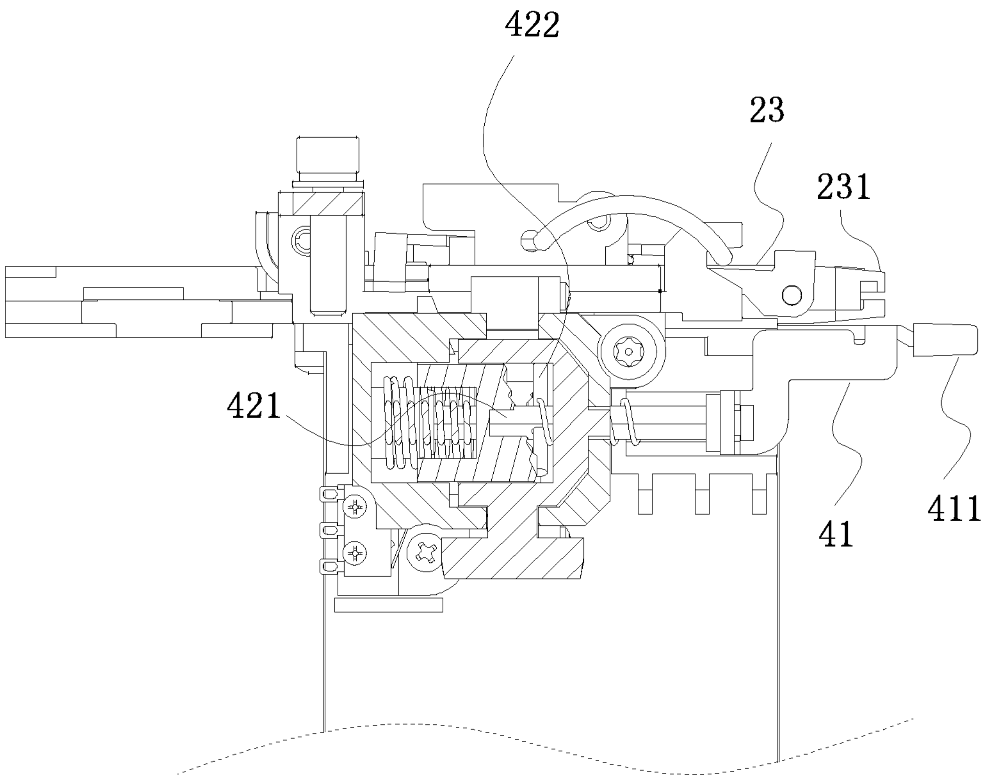
FIG. 8 is a sectional view of a trigger member when a nail gun has a minimum penetration depth.

FIGS. 6*a* and 6*b* separately show the positional relationships between the drive member 42 and the gear piece 44 in the cases where the operating piece 432 is operated to different positions. As described above, the gear piece 44 has the multiple stoppers 441. The nail gun 100 has different penetration depths when the stopper rod 422 abuts against the different stoppers 441. FIG. 6*a* shows the positional relationship between the stopper rod 422 and the gear piece 44 in the case where the nail gun 100 in this example has a maximum penetration depth. FIG. 6*b* shows the positional relationship between the stopper rod 422 and the gear piece 44 in the case where the nail gun 100 in this example has a minimum penetration depth. The operating member 43 can be triggered to rotate about the first straight line 101 to move the operating piece 432 to a first position or a second position, where the nail gun 100 has a maximum desired penetration depth as shown in FIG. 7 when the operating piece 432 is at the first position, and the nail gun 100 has a minimum desired penetration depth as shown in FIG. 8 when the operating piece 432 is at the second position. In some examples, when the operating member 43 switches from the first position to the second position, an angle by which the operating member 43 rotates about the first straight line 101 is less than or equal to 360°. In some examples, when the operating member 43 switches from the first position to the second position, an angle by which the operating member 43 rotates about the first straight line 101 is less than or equal to 180°. In some examples, when the operating member 43 switches from the first position to the second position, an angle by which the operating member 43 rotates about the first straight line 101 is less than or equal to 150°. In some examples, when the operating member 43 switches from the first position to the second position, an angle by which the operating member 43 rotates about the first straight line 101 is less than or equal to 120°.

In some examples, referring to FIGS. 1 and 3, the housing 10 is formed with or connected to a first stopper 13 and a second stopper 14. The first stopper 13 and the second stopper 14 are used for limiting the angle by which the operating member 43 rotates. When the operating member 43 abuts against the first stopper 13, the trigger member 40 is at the first position, and the nail gun 100 has the maximum penetration depth. When the operating member 43 abuts against the second stopper 14, the trigger member 40 is at the second position, and the nail gun 100 has the minimum penetration depth.

It is to be noted that FIGS. 6*a* and 6*b* only show the two positional relationships between the drive member 42 and the gear piece 44 in the cases where the nail gun 100 has the maximum desired penetration depth and the minimum desired penetration depth. In fact, the operating member 43 in this example can be triggered to move around the first straight line 101 to a third position. It is to be understood that when the trigger rod 41 moves to the third position, the desired penetration depth of the nail gun is between the minimum penetration depth and the maximum penetration depth. It is to be noted that when the trigger rod 41 is at the third position, the desired penetration depth of the nail gun is varied according to the number of stoppers 441 on the gear block 44.

In some examples, the operating member 43 is triggered to have at least the first position and the second position. When the operating member 43 is operated to the first position, the nail gun 100 has the maximum desired penetration depth. When the operating member 43 is operated to the second position, the nail gun 100 has the minimum desired penetration depth. The operating member 43 includes the operating piece 432 formed with an operating portion disposed outside the housing 10. A projection of the operating portion being on a first plane 102 when the operating member 43 is located at the first position separately and a projection of the operating portion being on the first plane 102 when the operating member 43 is located at the second position separately are at least partially non-overlapping with each other. The first plane 102 is substantially perpendicular to the direction in which the fastener is shot.

In some examples, the operating member 43 also has other forms. Specifically, the operating member is triggered to have the first position and the second position. When the operating member is operated to the first position, the nail gun has the maximum desired penetration depth. When the operating member is operated to the second position, the nail gun has the minimum desired penetration depth. The operating member 43 includes the operating piece 432. The operating piece 432 is formed with the operating portion disposed outside the housing, where the distance of the operating portion is greater than or equal to 5 mm and less than or equal to 50 mm when the operating member 43 is located at the first position and the second position. Optionally, the distance of the operating portion is greater than or equal to 10 mm and less than or equal to 40 mm when the operating member 43 is located at the first position and the second position. Optionally, the distance of the operating portion is greater than or equal to 15 mm and less than or equal to 35 mm when the operating member 43 is located at the first position and the second position. Optionally, the distance of the operating portion is greater than or equal to 20 mm and less than or equal to 30 mm when the operating member 43 is located at the first position and the second position. In some examples, the operating member 43 may be configured to be an operating handle and moves along a preset straight or curved path so that the desired penetration depth of the nail gun is adjusted. It is to be understood that the preceding operating portion should be understood as a portion operated by the user. The distance of the preceding operating portion in the cases where the operating member is at the first position and the second position may be understood as the distance of the same position on the operating portion in the cases where the operating member is at the first position and the second position.

With the technical solution to adjust the desired penetration depth of the nail gun 100 in the preceding example, the penetration depth of the nail gun can be rapidly adjusted and the structure is simple so that it is more convenient for the user to operate the nail gun.

Figure 9:
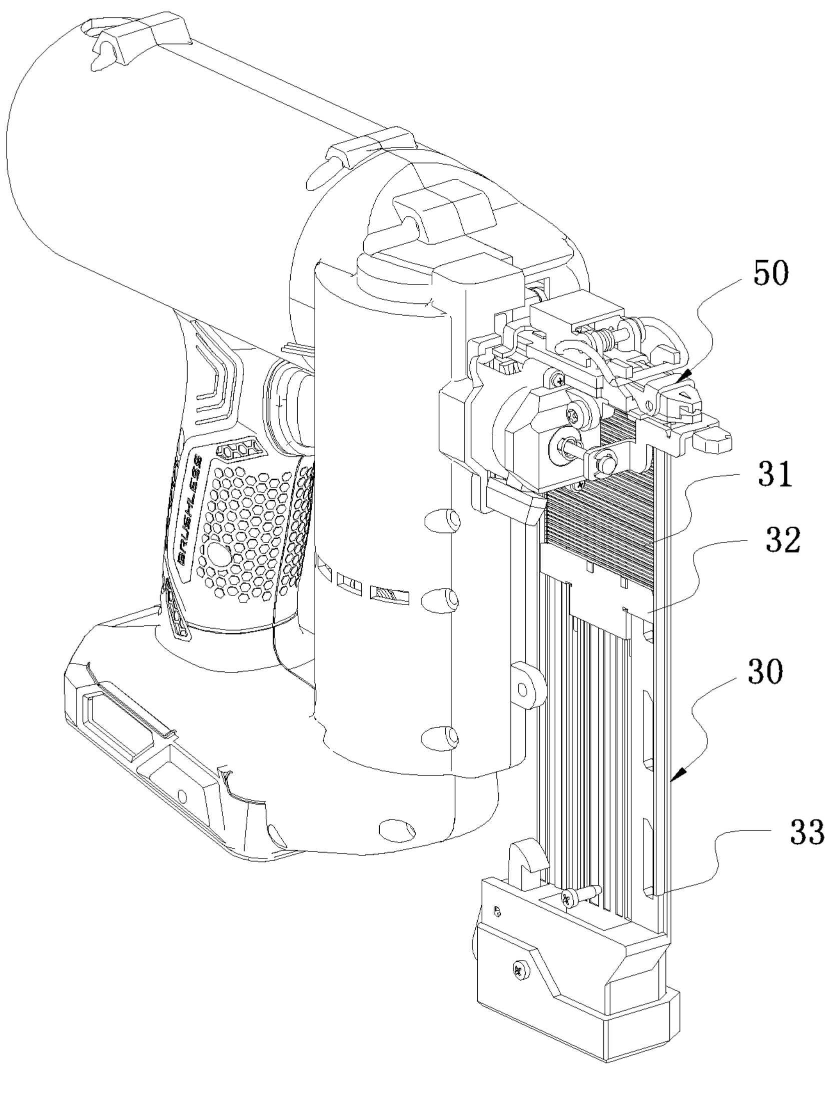
FIG. 9 is a perspective view of a nail gun with a second housing of an accessory box removed.

Referring to FIG. 9, the accessory box 30 is used for mounting a fastener 31. The accessory box 30 includes a first housing 33, a second housing 34, and a nail pusher 32. The first housing 33 is fixedly connected to the output end 23 of the power output portion 20, the nail pusher 32 is connected to the second housing 34, and the second housing 34 is movably connected to the first housing 32 and is limited within the travel range of a guide rail formed by the first housing 33. When the accessory box 30 is loaded with the nails for operation, the nail pusher 32 pushes the nails to move toward the output end 23 of the power output portion 20 and drives the nails out through a striker disposed in the output end 23. As the nails are continuously driven out, the nail pusher 32 continuously approaches the output end 23. As the nail pusher 32 continues approaching the output end 23, the fasteners 31 in the accessory box 30 are gradually reduced. When the fasteners 31 are used up or missing, energy or time is wasted and working efficiency is reduced if the strike is continued. On the other hand, when the nail gun performs an idle strike, the user is prone to assume that the nail has been shot into the workpiece, thereby causing a safety hazard.

Figure 10:
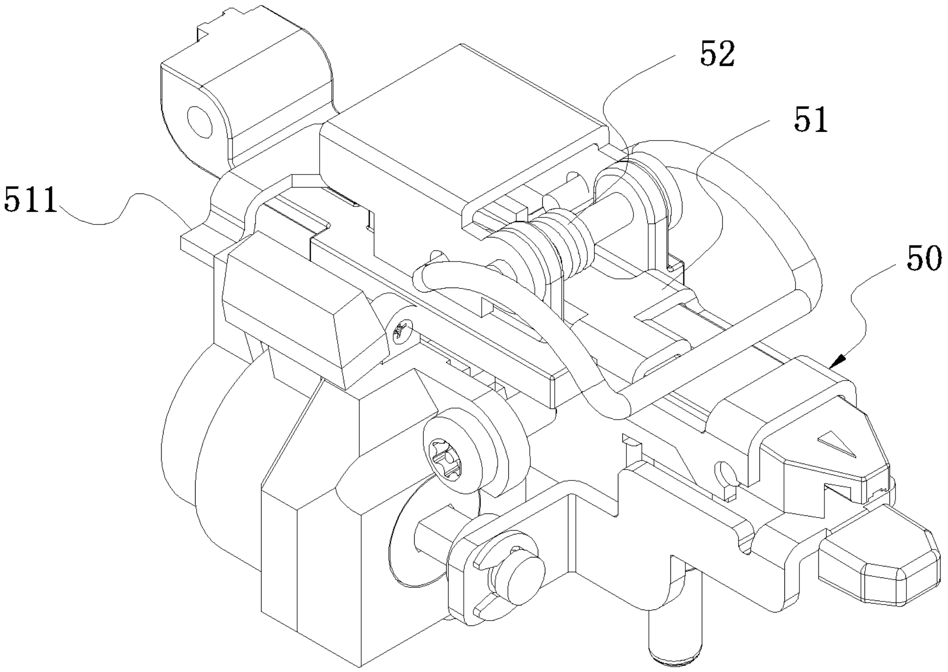
FIG. 10 is a perspective view of a brake member and a trigger member of a nail gun.
Figure 11:
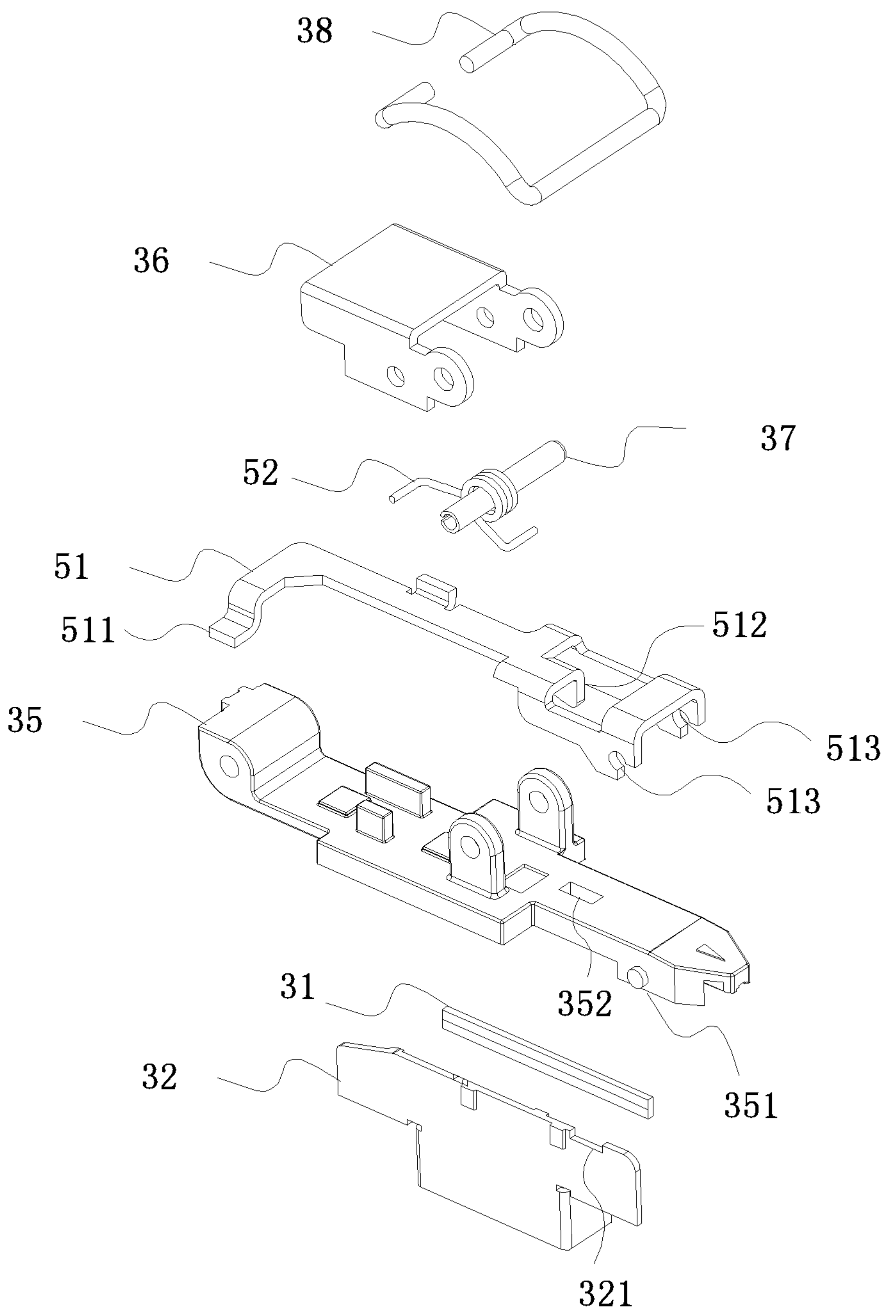
FIG. 11 is an exploded view of the brake member and the trigger member in FIG. 10.

In some examples, referring to FIGS. 9 to 11, the nail gun 100 further includes a brake member 50. The brake member 50 switches from a released state to a locked state when the fastener 31 in the accessory box 30 satisfies a preset state. When the brake member 50 is in the locked state, the power output portion 20 stops outputting the striking force. In some examples, the preset state is set as a missing fastener 31. In some examples, the preset state is set as a stuck fastener 31. In some examples, the preset state is set as the preset number of remaining fasteners 31. In this example, the preset state is set as the missing fastener 31.

Specifically, the accessory box 30 further includes an upper cover 35, a connection piece 36, a connection rod 37, and a fixing piece 38. When the nail gun 100 performs the nailing, the user can operate the fixing member 38 so as to open the upper cover 35 and observes the state of the fastener 31 in the accessory box 30 in the case of an abnormality such as a stuck nail. In some examples, the brake member 50 is at least partially located above the fastener 31 and abuts against the fastener 31. In some examples, the brake member 50 is at least partially located above the upper cover of the accessory box 30. In some examples, the brake member 50 directly abuts against the fastener 31. In other examples, the brake member 50 abuts against the fastener 31 indirectly.

In this example, the brake member 50 includes a third resilient element 52 for disposing the brake piece 51 and applying a force toward the upper cover 35 to the brake piece 51. The brake piece 51 is formed with connection portions 513 for being rotatably connected to the upper cover 35. Specifically, the upper cover 35 is formed with protrusion portions 351, where the connection portions 513 are sleeved on the protrusion portions 351 and are limited to being rotatably connected to the protrusion portions 351. The third resilient element 52 is sleeved on the connection rod 37 to apply the force toward the upper cover 35 to the brake piece 51. In this example, the third resilient element 52 is configured to be a torsion spring.

Figure 12:
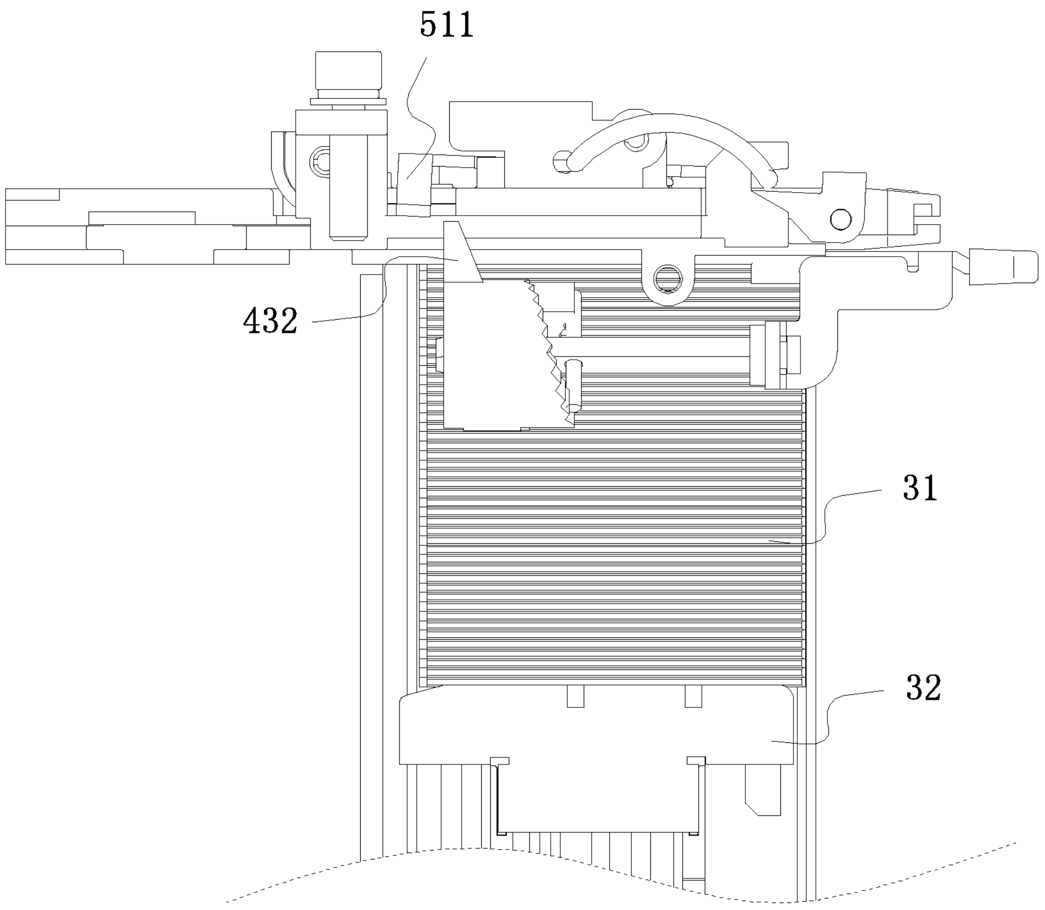
FIG. 12 is a view showing the positional relationship between a brake piece and a gear piece in the case where a brake member is in a released state.
Figure 13:
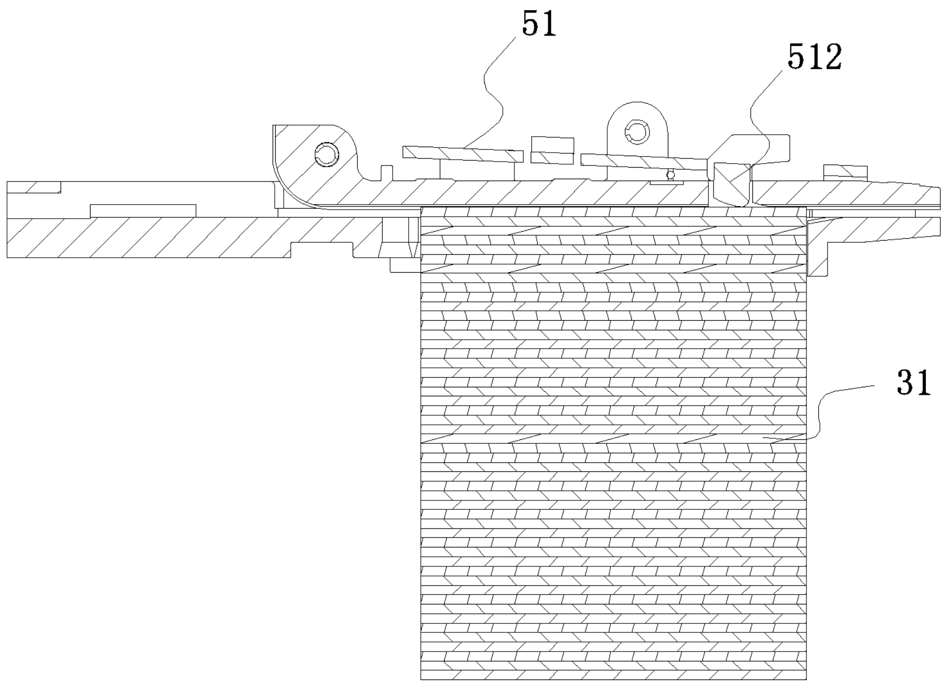
FIG. 13 is a sectional view of the brake piece and the gear piece in FIG. 12.
Figure 14:
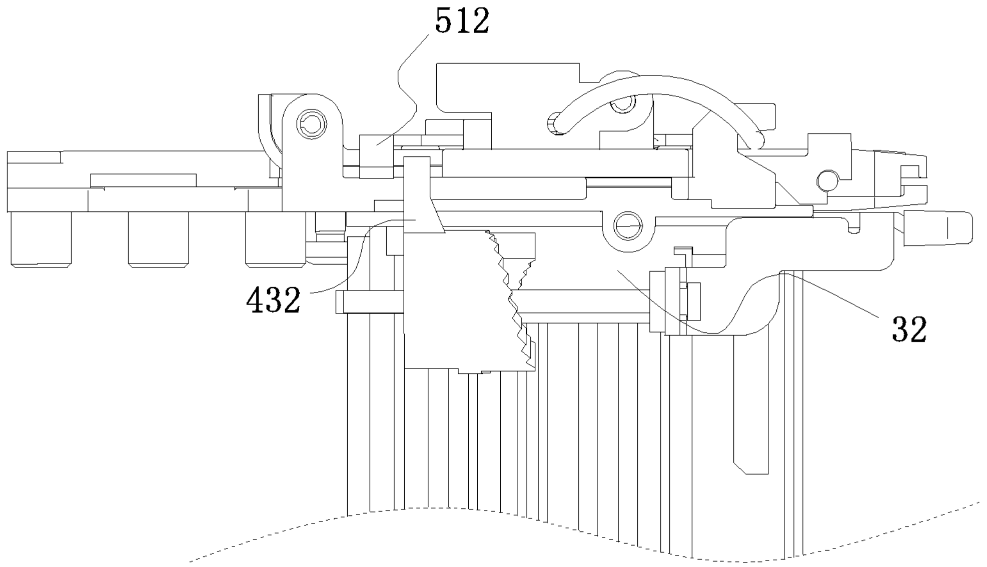
FIG. 14 is a view showing the positional relationship between a brake piece and a gear piece in the case where a brake member is in a locked state.
Figure 15:
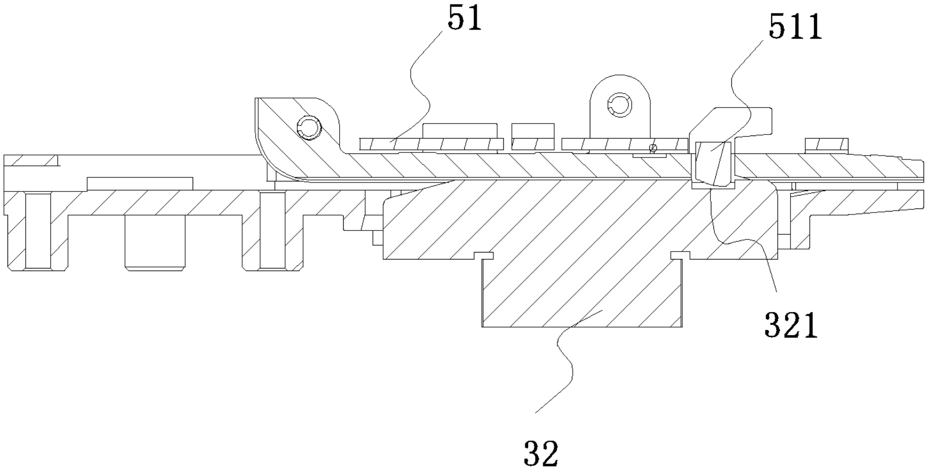
FIG. 15 is a sectional view of the brake piece and the gear piece in FIG. 14.

The brake piece 51 is also formed with a first brake portion 511 and a second brake portion 512. The upper cover 35 is formed with a third through hole 352, and the second brake portion 512 is at least partially disposed in the third through hole 352 and extends out of the third through hole 352 to abut against the fastener 31. As shown in FIGS. 12 and 13, when the fastener 31 exists in the accessory box 30, the second brake portion 512 abuts against the fastener 31, the first brake portion 511 is at a released position, and the brake member 50 is in the released state. When the first brake portion 511 is at the released position, the trigger rod 41 can be operated to move the gear piece 44 along the first straight line 101 such that the first switch 12 is triggered. As shown in FIGS. 14 and 15, when the fastener 31 is missing from the accessory box 30, the second brake portion 512 is at least partially located in a slot 321 formed by the nail pusher 32, the first brake portion 511 is at a locked position, and the brake member 50 is in the locked state. When the first brake portion 511 is at the locked position, the gear piece 44 abuts against the first brake portion 511 so that the first switch 12 cannot be triggered.

In this way, the brake member 50 is provided such that the brake piece 51 is controlled to switch from the released position to the locking position when the fastener 31 is missing, thereby implementing the idle-strike-prevention function of the nail gun 100. The brake member 50 in the present application has a simple structure and high reliability so that the utilization rate of fasteners in the accessory box can be improved and the waste of the fasteners can be avoided.

The preceding examples only illustrate the nail gun with a battery pack exemplarily. In fact, the technical solutions in the present application are also applicable to nail guns powered in other forms, for example, electric nail guns powered by mains. The technical solutions in the present application are also applicable to pneumatic nail guns.

The idle-strike-prevention structure of nail guns in the related art is optimized so that on the one hand, the idle-strike-prevention structure has a more reliable and simpler structure and is less expensive, and on the other hand, nail guns can prevent an idle strike truly, thereby improving the utilization rate of fasteners of nail guns and avoiding the waste of the fasteners.

The basic principles, main features, and advantages of this application are shown and described above. It is to be understood by those skilled in the art that the aforementioned examples do not limit the present application in any form, and all technical solutions obtained through equivalent substitutions or equivalent transformations fall within the scope of the present application.

What is claimed is:

1. A nail gun, comprising:

a housing;

an accessory box for accommodating a fastener and at least partially connected to the housing;

a power output portion for outputting a striking force to the fastener; and an operating member triggered to have at least a first position, a second position, and a third position located between the first position and the second position wherein the nail gun has a maximum desired penetration depth when the operating member is operated to the first position, the nail gun has a minimum desired penetration depth when the operating member is operated to the second position, and the nail gun has an intermediate desired penetration depth when the operating member is operated to the third position;

wherein the operating member comprises an operating portion operated by a user and the operating member and the operating portion move along a preset path when the operating member is triggered to switch from the first position to the second position, an angle by which the operating portion rotates about a first straight line is less than or equal to 180°, the operating member is triggered to the third position when the operating member is triggered to switch from the first position to the second position, and the operating member at the third position is capable of being triggered to switch to the first position or the second position, and an operating plane formed by a movement of a point on the operating portion along the preset path is substantially perpendicular to a direction of movement of the fastener.

2. The nail gun according to claim 1, further comprising a trigger member and a first switch, wherein the trigger member is connected to the power output portion and is movable relative to the accessory box to a first state in which the first switch is triggered and a second state in which the first switch is not triggered, and the power output portion stops outputting the striking force when the first switch is not triggered.

3. The nail gun according to claim 2, wherein the first switch is triggered once such that the power output portion outputs the striking force to the fastener once.

4. The nail gun according to claim 2, wherein the trigger member comprises at least a trigger rod, a drive rod, and a gear piece, the gear piece is formed with or connected to a plurality of stoppers, a first end of the drive rod abuts against the gear piece, and a second end of the drive rod is connected to the trigger rod.

5. The nail gun according to claim 4, wherein the drive rod is movable along the first straight line when the operating member is operated to rotate about the first straight line.

6. The nail gun according to claim 5, wherein the operating member comprises a first portion at least partially disposed in the housing and a second portion extending from the first portion to an outside of the housing.

7. The nail gun according to claim 6, wherein the second portion is triggered to move the trigger member toward and away from the housing so that a desired penetration depth of the nail gun is defined.

8. The nail gun according to claim 1, wherein a first stopper and a second stopper are formed on the housing, the operating member is located at the first position when abutting against the first stopper, and the operating member is located at the second position when abutting against the second stopper.

9. The nail gun according to claim 1, further comprising a brake member switching from a released state to a locked state when the fastener satisfies a preset state, wherein the power output portion stops outputting the striking force when the brake member is in the locked state, and the brake member is at least partially located above the fastener.

10. The nail gun according to claim 9, wherein the accessory box comprises a first housing, a second housing, and an upper cover, the first housing and the second housing form an accommodating space for accommodating the fastener, the upper cover is disposed above the fastener, and the brake member is connected to the upper cover.

11. The nail gun according to claim 10, wherein the brake member comprises a brake piece formed with or connected to a first brake portion and a second brake portion, the upper cover is formed with a through hole, and the second brake portion is at least partially disposed in the through hole.

12. The nail gun according to claim 11, wherein the accessory box further comprises a nail pusher for applying pressure to the fastener, and the nail pusher is formed with a slot disposed opposite to the second brake portion in an up and down direction.

13. The nail gun according to claim 12, further comprising a trigger member and a first switch, wherein the trigger member is connected to the power output portion and is movable relative to the accessory box to a first state in which the first switch is triggered and a second state in which the first switch is not triggered, and the power output portion stops outputting the striking force when the first switch is not triggered.

14. A nail gun, comprising:

a housing;

an accessory box for accommodating a fastener and at least partially connected to the housing; and a power output portion for outputting a striking force to the fastener; and an operating member, wherein an operating piece is movable between a first position and a second position, the nail gun has a maximum desired penetration depth when the operating member is operated in the first position, and the nail gun has a minimum desired penetration depth when the operating member is operated in the second position, wherein the operating member comprises an operating portion operable by a user to move the operating member, the operating portion disposed outside the housing, wherein a moving distance of the operating portion is greater than or equal to 5 mm when the operating member is moved between the first position and the second position, when the operating member is moved from the first position to the second position, a plane formed by a point on the operating portion is substantially perpendicular to a direction in which the fastener is shot.

15. The nail gun according to claim 14, wherein the operating member further comprises a second portion disposed in the housing, and the second portion is triggered to move a trigger member toward and away from the housing so that a desired penetration depth of the nail gun is defined.

16. The nail gun according to claim 14, wherein a trigger member is connected to the power output portion and is movable relative to the accessory box to a first state in which a first switch is triggered and a second state in which the first switch is not triggered, and the power output portion stops outputting the striking force when the first switch is not triggered.

17. A nail gun, comprising:

a housing;

an accessory box for accommodating a fastener and at least partially connected to the housing; and a power output portion for outputting a striking force to the fastener;

an operating member triggered to have a first position, a second position, and a third position, wherein the nail gun has a maximum desired penetration depth when the operating member is operated to the first position, and the nail gun has a minimum desired penetration depth when the operating member is operated to the second position, and the nail gun has an intermediate desired penetration depth when the operating member is operated to the third position, wherein the operating member comprises an operating portion for a user to operate, the operating portion being disposed outside the housing, and when the operating member is moved between the first position, the second position, and the third position, a plane formed by a point on the operating member moving in a moving direction of the operating portion is substantially perpendicular to a direction in which the fastener is shot.

18. The nail gun according to claim 17, wherein the operating member further comprises a second portion disposed in the housing, and the second portion is triggered to move a trigger member toward and away from the housing so that a desired penetration depth of the nail gun is defined.

* * * * *